(12) United States Patent
Gherardini

(10) Patent No.: US 6,632,102 B1
(45) Date of Patent: Oct. 14, 2003

(54) FIBER OPTIC CONNECTOR WITH UNLATCHING AND PARTIAL DISASSEMBLY

(75) Inventor: Stephen Daniel Gherardini, Harrisburg, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/235,967

(22) Filed: Sep. 4, 2002

(51) Int. Cl.[7] .............................................. H01R 13/627
(52) U.S. Cl. ...................................................... 439/352
(58) Field of Search ................................ 439/352–355; 385/76

(56) References Cited

U.S. PATENT DOCUMENTS 5,820,398 A * 10/1998 Stabroth et al. ............ 439/592
6,491,542 B1 * 12/2002 Zerebilov ................... 439/489
6,565,263 B2 * 5/2003 Schulz et al. ................ 385/76

* cited by examiner

Primary Examiner—Hung V. Ngo
(74) Attorney, Agent, or Firm—Roger C. Turner

(57) ABSTRACT

An optical fiber connector assembly includes a body (22) with passages (26) that hold optical fibers and a backshell (24) that can be removed and slid along the optical fiber cable to provide access to the fibers so a selected fiber can be removed while the rest of the fibers continue to carry signals. The removable backshell carries a mechanism (150) that can be manually operated to unlatch the connector from a housing (12), despite removeability of the backshell. The mechanism includes a cam (152) rotatable about the cable-receiving aperture (32) in the backshell and a cam follower (142) that is pushed forwardly by rotation of the cam. The cam follower presses forwardly against a pair of release elements (130) in the body to cause them to deflect a pair of latch arms (120) out of engagement with shoulders (124) of the body so the body can be pulled rearwardly out of the housing.

8 Claims, 5 Drawing Sheets

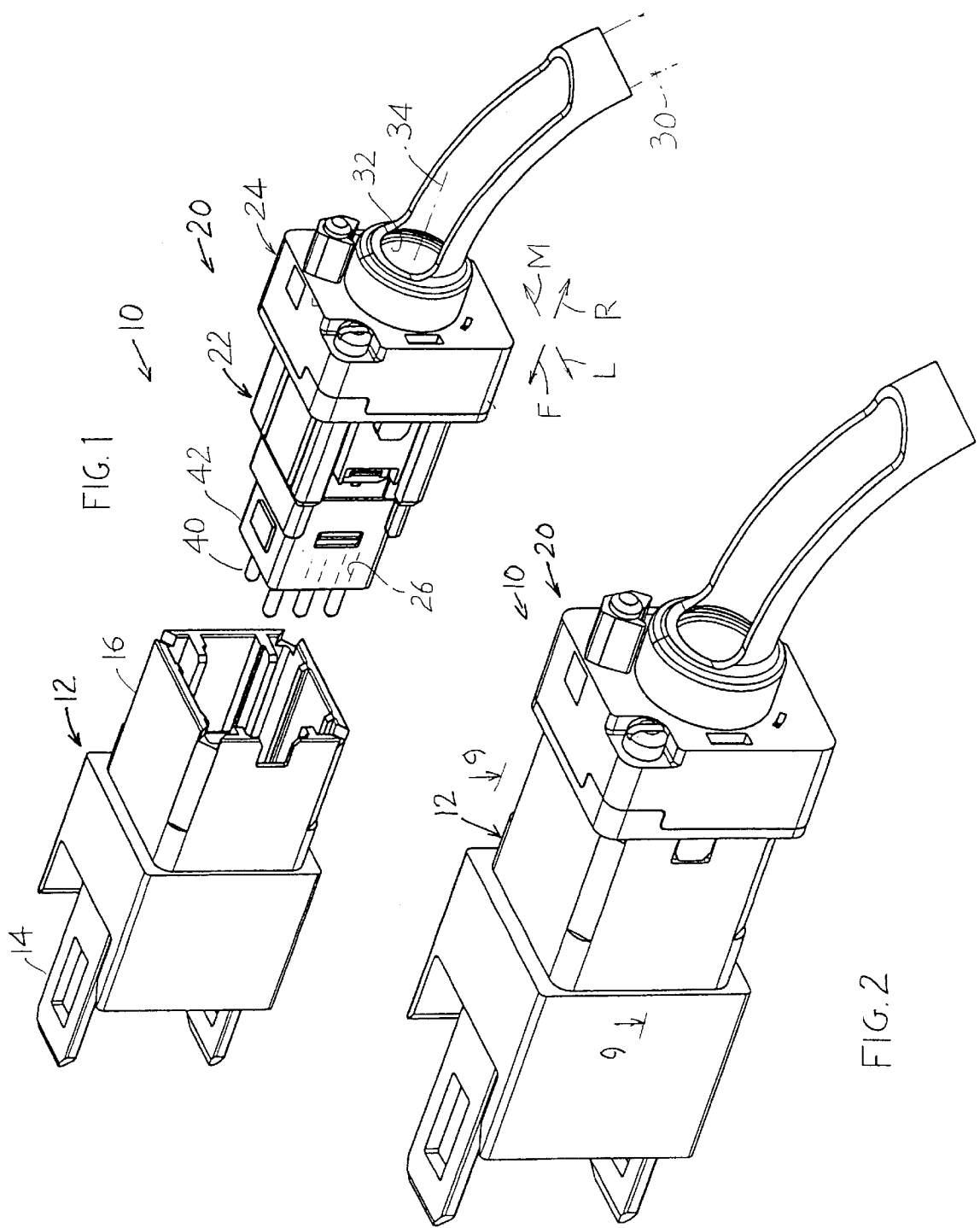

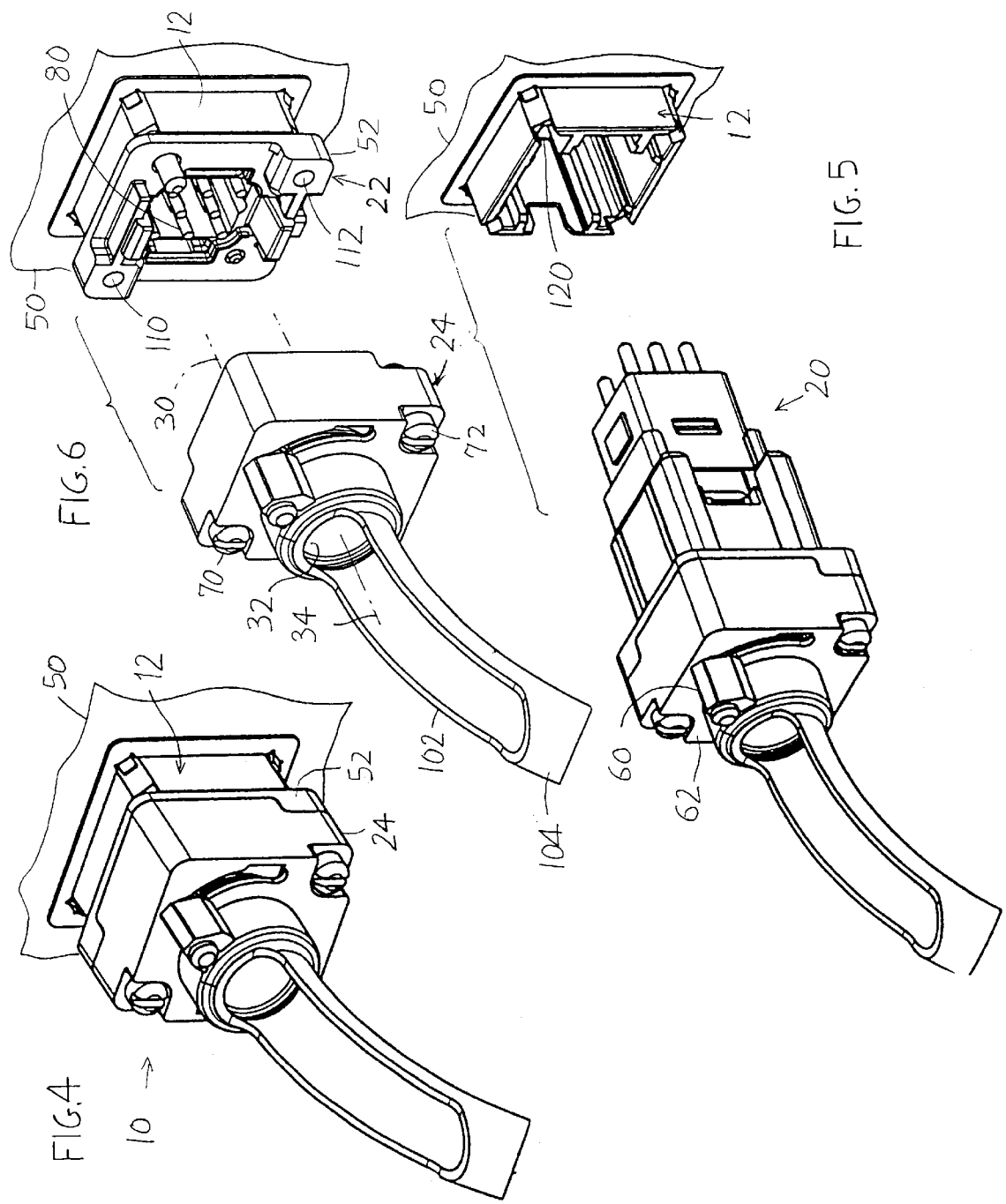

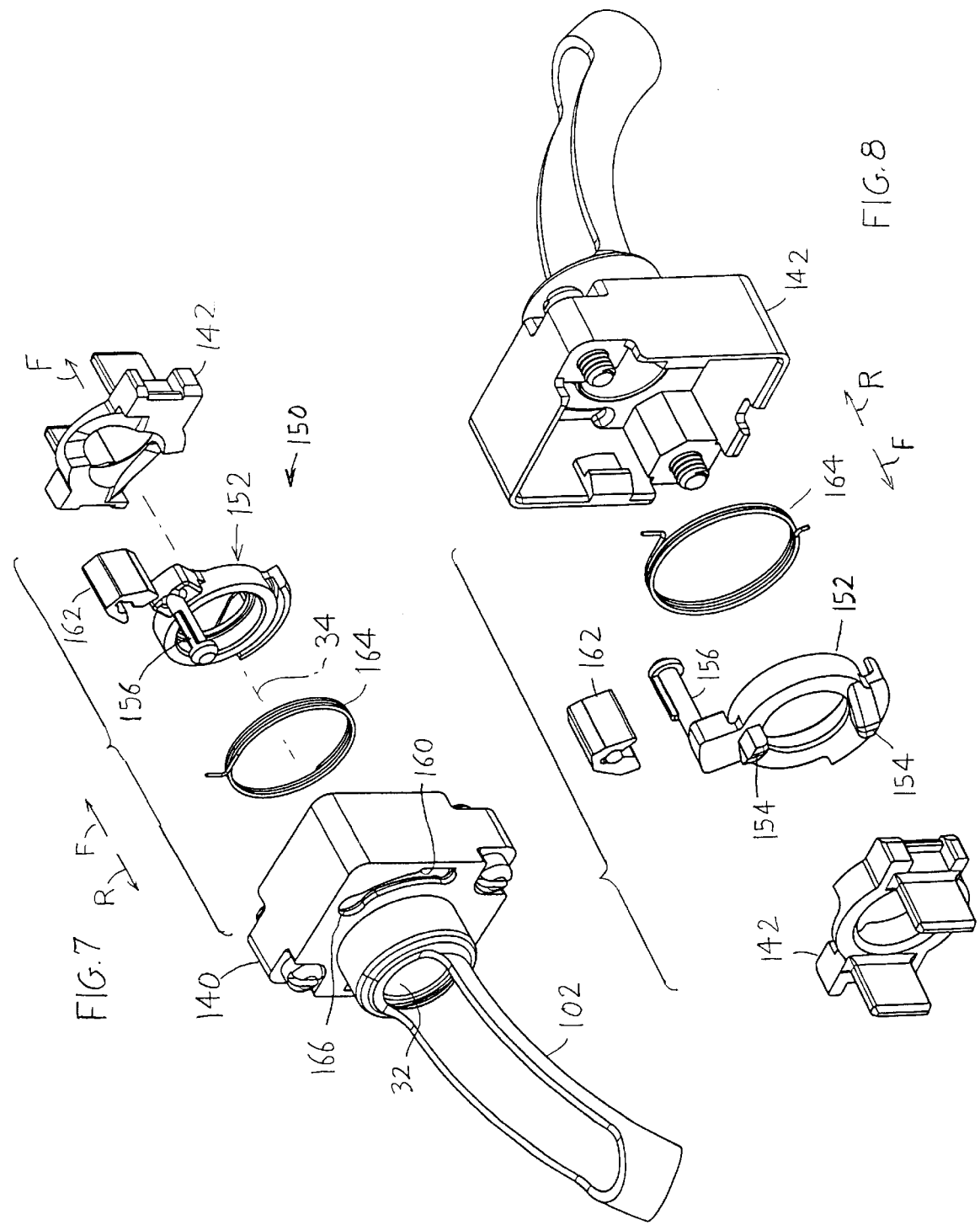

FIBER OPTIC CONNECTOR WITH UNLATCHING AND PARTIAL DISASSEMBLY

BACKGROUND OF THE INVENTION

Optical fiber assemblies commonly include a housing that is mounted on a panel and a body with fiber-holding passages, that can be inserted and retracted from the housing, and therefore from the panel. There are times when it is desirable to retract only a single one of a plurality of fibers out of a corresponding body passage, while leaving the rest of the fibers in place so they can continue to carry signals. Such capability should be in addition to the ability to remove the entire body. Furthermore, it is desirable that the body project a minimum distance from a panel in which the housing and body are mounted. An optical fiber assembly that enables such versatile disassembly and unlatching, would be of value.

SUMMARY OF THE INVENTION

In accordance with one embodiment of the present invention, an optical fiber connector assembly is provided, which enables unlatching of the body from a housing and partial disassembly that enables the retraction of a single one of multiple fibers, in a connector that projects only a small distance rearward of a panel into which it and its housing are inserted. The connector includes a body that forms the fiber-receiving passages that hold fiber-receiving ferrules, and a backshell that can be readily fastened and unfastened from the body. When the backshell is removed, a technician has access to individual fiber assemblies to remove a selected one of them.

The backshell carries a cam that is operated by a handle lying beside the cable-receiving aperture of the backshell. When the cam is moved against the force of a spring, as by pivoting it about the axis of the cable-receiving aperture, the cam pushes a cam follower forwardly. The cam follower forwardly pushes a pair of release members slidably mounted on the body. The release members deflect a pair of latch arms on the housing out of engagement with shoulders on the body, so the body can be pulled out.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded rear and left side isometric view of a connector assembly of the present invention, with ferrules installed but with the optic fiber cable shown only in phantom lines.

FIG. 2 is a rear isometric view of the connector assembly of FIG. 1 in the fully assembled position.

FIG. 4 is a partial rear isometric view of the connector assembly of FIG. 2, shown installed in a panel.

FIG. 5 is an exploded isometric view similar to FIG. 4, with the housing installed in a panel but with the connector withdrawn from the housing.

FIG. 6 is an exploded isometric view similar to FIG. 4, with the housing and connector body installed in a panel but with the backshell detached from the connector body.

FIG. 7 is an exploded rear isometric view of only the backshell of the connector of FIG. 6.

FIG. 8 is an exploded front isometric view of the apparatus of FIG. 7.

DESCRIPTION OF THE PREFERRED EMBODIMENTS

Figure 3:
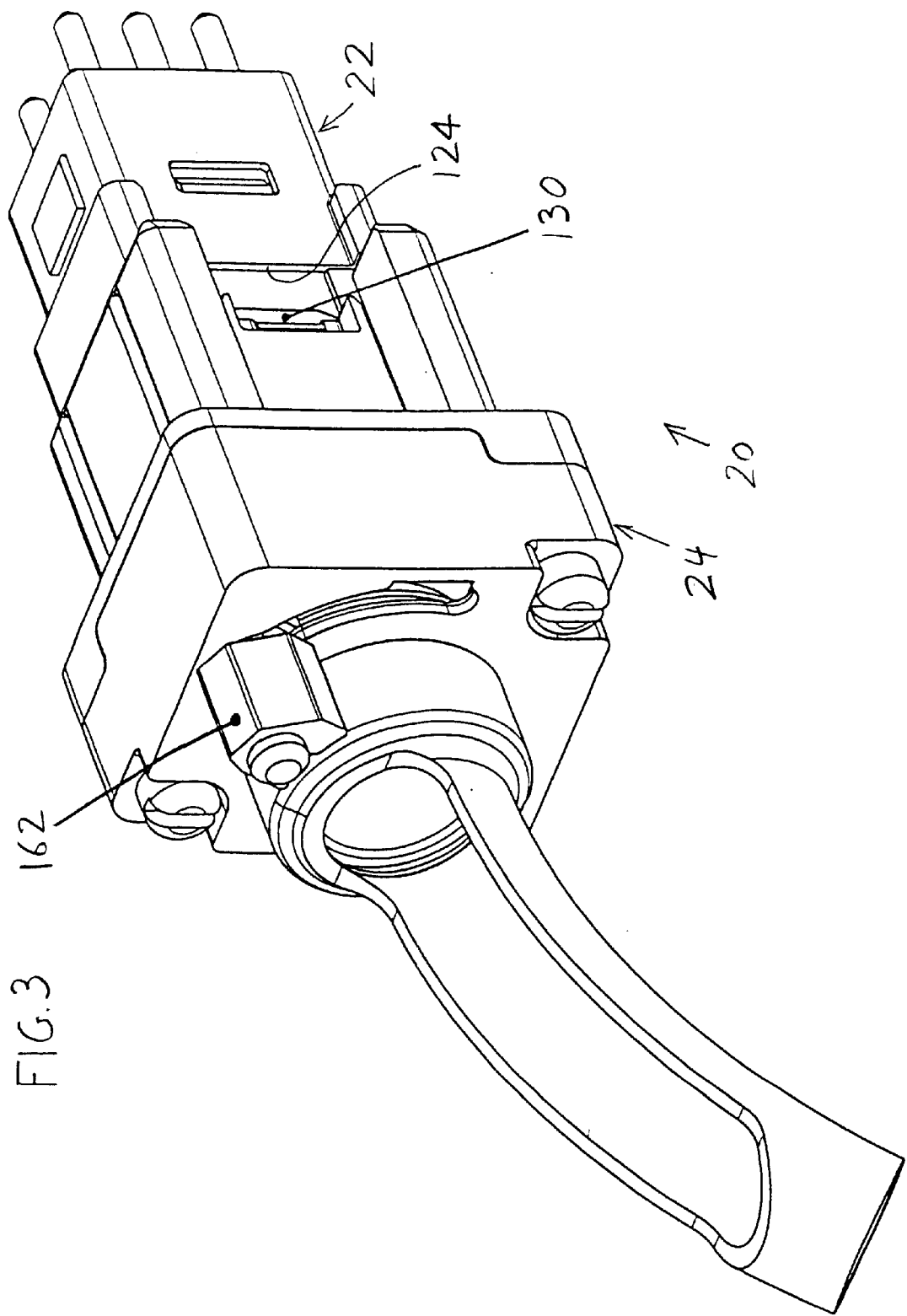
FIG. 3 is a rear isometric view of only the connector of FIG. 1, but taken from the right side.

FIG. 1 illustrates an optical fiber connector assembly 10 which includes a housing 12 that has a front end 14 for attachment to another, mating connector assembly, and a rear end 16. Front and rear directions are indicated by arrows F, R and left and right directions are indicated by arrows L, M. The connector assembly includes a connector 20 having a body 22 and a backshell 24 at the rear of the body. The body 22 has a plurality of fiber-holding passages 26. A fiber optic cable 30 extends through an aperture 32 lying at the axis 34 of the connector. The particular connector illustrated connects to a cable 30 with eight optical fibers that pass through eight corresponding ferrules 40 that project from the front end 42 of the body.

FIG. 4 illustrates the connector assembly 10 installed in a panel 50, with a rear portion 52 of the body and the rear portion of the housing 12 projecting rearward of the panel, but with the entire backshell 24 lying rearward of the panel. FIG. 5 illustrates the assembly of FIG. 4, after the connector 20 has been removed from the housing 12 which remains in the panel 50. In order to remove the connector 20, a technician operates an actuator 60 projecting from the rear end 62 of the backshell 24 to deflect a pair of latch arms of the housing 12 to release the connector.

FIG. 6 shows the housing 12 and rear end 52 of the connector body 22 lying in a panel 50, with only the backshell 24 detached from the body 22 and slid rearwardly along the optical fiber cable 30. Such removal is accomplished by unscrewing a pair of screws 70, 72 spaced about the axis 34 of the cable-passing aperture 32 in the backshell. With the backshell slid rearwardly along the cable, ferrule assemblies 80 which receive the eight optical fibers of the cable, are accessible.

There are situations where a technician wishes to gain access to a single one of the eight ferrule assemblies 80 and the corresponding optical fibers that pass therethrough, without disturbing the other seven ferrules and their optical fibers. In one example, a poor connection may be detected along one line that includes one of the eight ferrule assemblies 80, and the signals have been switched to another one of the eight lines. A technician wishes to determine the trouble in the line with a poor connection. The technician can remove the backshell 24 and slide it rearwardly along the cable 30 to expose the rear of the connector body 22 and the rear of the eight ferrule assemblies 80. The technician then can insert a releasing tool around a selected ferrule assembly 80 to release it and pull out that ferrule assembly and the fiber extending through it. The technician can examine and possibly repair the ferrule assembly, as by cleaning a tip of the fiber and ferrule, which is often a cause of a poor connection. The technician then can reinsert the ferrule assembly 80 with its corresponding optical fiber and can test that line.

Figure 9:
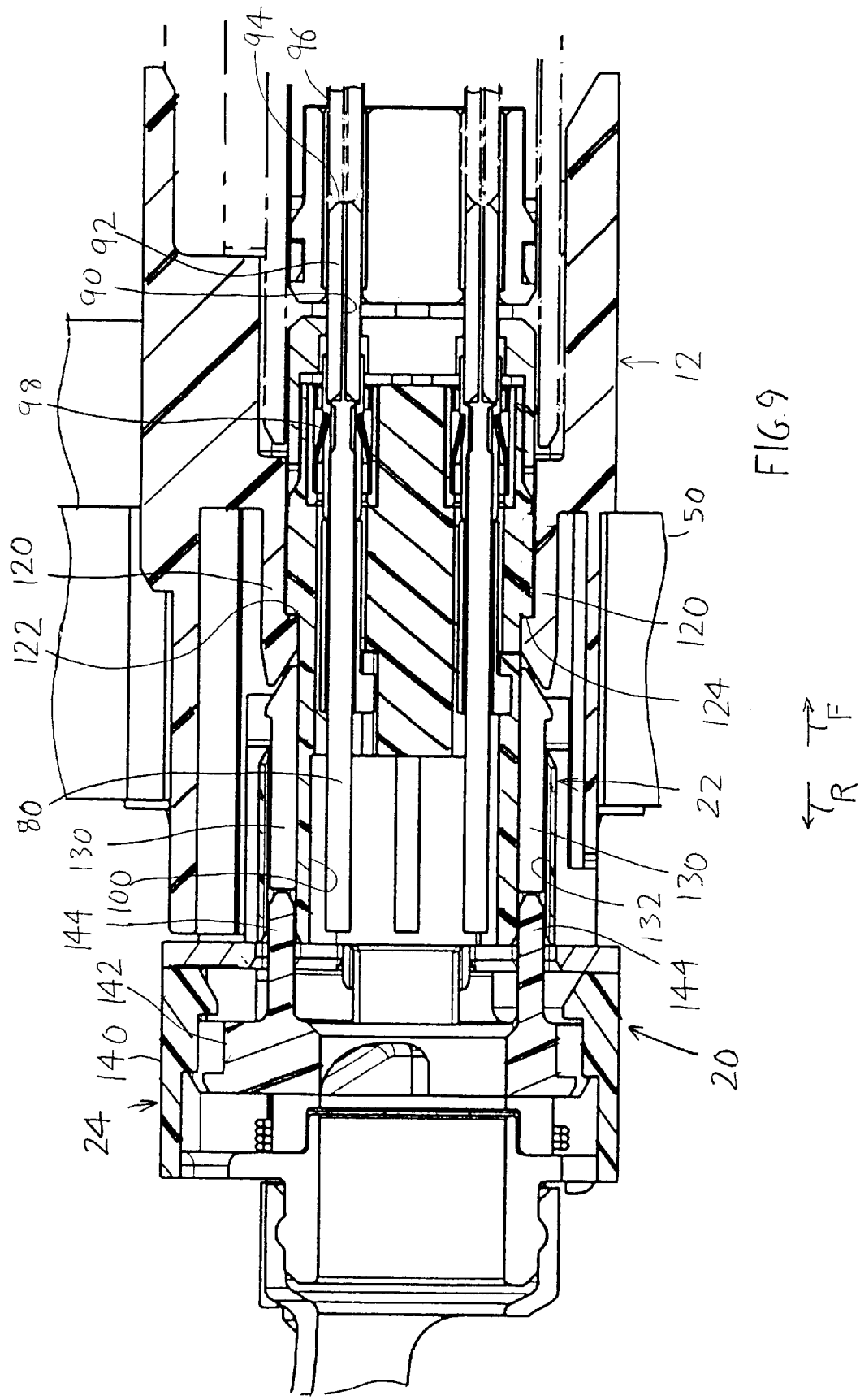
FIG. 9 is a sectional view taken on line 9—9 of FIG. 2, with the connector assembly installed in a panel.

FIG. 9 shows that each ferrule assembly 80 has a thin bore 90 through which a fiber 92 passes, with the tip 94 of the ferrule assembly and of the fiber being flush and lying against the tip of a fiber in a mating ferrule 96 of another mating connector assembly. A technician can remove one of the ferrule assemblies 80 by inserting a special tool around it to expand a clip 98 so as to release the ferrule assembly from the clip. A recess or chamber 100 around the rear ends of the ferrules facilitates access to the ferrules.

The backshell 24, shown in FIG. 6, includes a cable guider 102 extending in a curve to guide the cable. The cable guider includes a rear end at 104 that completely surrounds the cable. As a result, when the backshell is detached from the body and slides along the optical fiber cable, the backshell is not lost. Similarly, the screws 70, 72 and backshell holes are constructed to prevent loss of the screws from the backshell. The screws thread into threaded holes 110, 112 in an enlargement that forms the body rear end 52 to hold the backshell to the body. The cable guide 102 can be rotated 3600 with respect to the backshell to direct the cable in any direction.

As shown in FIG. 9, the connector 20 is latched to the housing 12 by a pair of latch arms 120 of the housing that have forwardly F facing shoulders 122 that engage rearwardly-facing shoulders 124 on the body. A pair of release elements 130 lie in corresponding pockets 132 formed in the connector body 22.

Each pocket 132 that holds a release member 130 is open in a rearward direction R. The backshell 24 includes a backshell frame 140 and a cam follower 142 with a pair of projections 144 that project into the pockets 132. The cam follower 142 can be forced to move forwardly, to thereby push the release elements 130 forwardly. The release elements then force the rear ends of the latch arms 120 to separate and allow the connector to be moved rearwardly out of the housing 12. The release elements cannot be lost because their enlarged front ends limit rearward movement and the body shoulders 124 limit forward movement.

FIGS. 7 and 8 illustrate details of a mechanism 150 that includes the cam follower 142 and that is mounted on the backshell frame 140. The mechanism includes a cam 152 that can pivot about the axis 34 and that has camming surface portions 154 that press against the cam follower 142 to push it forwardly F. The cam 152 includes an actuator formed by a pin 156 that projects through a slot 160 in the backshell frame 140 and a handle 162 fixed to the pin. The pin 156 can be moved in a clockwise direction (as seen in FIG. 7) to rotate the cam 152 and thereby move the cam follower up 142 forwardly F. A spring 164 urges the cam 152 to pivot towards its initial position, wherein the pin projects through a slot end 166 in the slot 160. The cam follower 152 is not spring biased, but is pushed rearwardly whenever the connector is inserted into the housing.

FIG. 6 shows that the backshell 24 and body rear end 52 are both of greater width and height than the rest of the body 22 that lies forward of the body rear end 52. Most of the body 22 is injection molded, with the body rear end 52 formed of metal and held in place by latches to the rest of the body, the metal providing strength for the threaded holes 110, 112. Two posts of different sizes prevent rotation of the metal component with respect to the rest of the body.

Thus, the invention provides an optical fiber connector assembly which includes a housing and a connector that lies in the housing. The connector and housing form latches that retain the connector in the housing. The latches can be deflected to release the connector for withdrawal from the housing by a cam mechanism operated from the rear of the connector, from a backshell at the rear of the connector. The backshell can be removed from the body of the connector by removing fasteners such as a pair of screws, which enables access to individual ferrule assemblies and their corresponding fibers that lie at the front of the body. This enables a technician to remove a selected ferrule assembly while the rest of the ferrule assemblies and corresponding fibers carry signals.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector assembly which includes a housing that has a front end for attachment to another mating connector assembly and a rear end, and a connector that includes a body that has front and rear end and a plurality of fiber-holding passages extending in front and rear directions, said body being insertable forwardly into said housing and said assembly forming a latch mechanism that retains said body in said housing, wherein:

said connector includes a backshell lying at the rear of said body, said backshell having a cable passage for passing an optic cable that has an optic fiber lying in one of said fiber-holding passages;

said connector includes at least one fastener that detachably mounts said backshell to a rear end of said body, whereby to provide access to an optical fiber while said body remains in said housing.

2. The assembly described in claim 1 wherein:

said body has a rectangular front portion of predetermined width and height that is insertable into said housing, and said body has a rectangular rear portion of greater width and height than said front portion and that projects rearwardly from said housing;

said backshell has the same width and height as said body rear portion.

3. The assembly described in claim 1 wherein:

said latch mechanism includes a pair of larch elements on said body that retain said body to said housing, a pair of release members mounted on said body and movable from initial positions to release positions to cause said latch elements to release said body from said housing, and an actuator mounted on said backshell and operable to move said release members to said release positions.

4. The assembly described in claim 3 wherein:

said backshell has an axis and said cable passage extends through said backshell along said axis;

said actuator includes a pin that is moveable along an arc about said axis, and said latch mechanism includes a cam that is rotatably mounted on said backshell about said axis and that is fixed to said pin and also includes a cam follower that is slideably mounted on said backshell and that is engaged with said cam, said release member being moveable by said cam follower to cause said latch elements to release said body.

5. An optical fiber connector assembly which includes a connector that holds an optical fiber cable, wherein:

said connector has an axis extending in front and rear directions, said connector includes a body with a front portion forming a plurality of fiber-holding passages and a rear portion forming a chamber that leads to all of said passages, said connector also including a backshell detachably mounted on a rear end of said body, said backshell having a fiber optic cable-passing aperture lying on said axis;

a plurality of fasteners that are spaced about said aperture and that detachably mount said backshell on said body rear portion, said backshell having a fiber optic cable guide that completely surrounds said cable, whereby said backshell can be detached from the body and slid rearward along the cable to provide access to the chamber for removal of only a single selected fiber from one of said passages.

6. The assembly described in claim 5 including:

a housing with a body-receiving inside and with a pair of internal, deflectable latch arms having forwardly-facing shoulders, said connector body being forwardly-insertable into said housing and said body having a pair of rearwardly-facing body shoulder that engage said latch arm shoulders to prevent rearward withdrawal of said body form said housing;

said body has a pair of slideable release elements that can slide to deflect said latch arms out of engagement with said body shoulders;

said backshell includes a backshell frame and a mechanism mounted on said frame and that is manually operable to slide said release elements to deflect said latch arm shoulders out of engagement with said body shoulders.

7. The assembly described in claim 6 wherein:

said mechanism of said backshell includes a cam follower slideably mounted in forward and rearward directions on said backshell frame and a pin with a rearwardly-projecting rear end forming a handle lying beside said cable-passing aperture, and a cam fixed to said pin to be moved by said pin, said cam being engaged with said cam follower to slide it.

8. The assembly described in claim 7 wherein:

said cable-receiving hole has an axis and said cam is pivotable about said axis.

* * * * *